(12) United States Patent
Hsiao et al.

(10) Patent No.: US 8,113,750 B2
(45) Date of Patent: Feb. 14, 2012

(54) FACE HOB HYPOID GEAR TOOTH CUTTING BY COMMON BLADES

(75) Inventors: Chunliang Hsiao, Troy, MI (US); Kelly Waller, Washington, MI (US); Jason R. Savage, Warren, MI (US); Paul J. Bojanowski, Macomb Township, MI (US); Stefano Lombardo, Shelby Township, MI (US)

(73) Assignee: Ford Motor Company, Dearborn, MI (US)

( * ) Notice: Subject to any disclaimer, the term of this patent is extended or adjusted under 35 U.S.C. 154(b) by 1141 days.

(21) Appl. No.: 11/872,415

(22) Filed: Oct. 15, 2007

(65) Prior Publication Data

US 2009/0097934 A1 Apr. 16, 2009

(51) Int. Cl.
*B23F 9/08* (2006.01)

(52) U.S. Cl. .................. 409/26; 409/39; 409/51

(58) Field of Classification Search .......... 409/12, 409/13, 17, 26, 27, 28, 38, 39, 51; 407/21, 407/22, 29

See application file for complete search history.

(56) References Cited

U.S. PATENT DOCUMENTS

| | | | |
|---|---|---|---|
| 2,510,528 A | 6/1950 | Soper | |
| 2,932,239 A * | 4/1960 | Wildhaber | 409/26 |
| 2,974,398 A * | 3/1961 | Spear | 407/21 |
| 2,978,792 A * | 4/1961 | Slayton | 407/22 |
| 4,093,391 A * | 6/1978 | Bachmann et al. | 407/22 |
| 4,904,129 A * | 2/1990 | Sugimoto et al. | 407/21 |
| 5,116,173 A | 5/1992 | Goldrich | |
| 5,290,135 A * | 3/1994 | Ball et al. | 407/11 |
| 5,662,514 A | 9/1997 | Masseth et al. | |
| 6,311,590 B1 | 11/2001 | Stadtfeld | |
| 6,398,467 B1 | 6/2002 | Herendeen et al. | |
| 6,536,999 B1 * | 3/2003 | Bradfield et al. | 409/26 |
| 6,540,446 B2 * | 4/2003 | Iizuka et al. | 407/21 |
| 6,609,858 B1 * | 8/2003 | Francis et al. | 407/21 |

\* cited by examiner

*Primary Examiner* — Daniel Howell
(74) *Attorney, Agent, or Firm* — Raymond Coppiellie; Ford Global Technologies, LLC

(57) ABSTRACT

A method includes selecting a first gear ratio and a second gear ratio. A first hypoid gear set defines the first gear ratio and a second hypoid gear set defines the second gear ratio. The first hypoid gear set includes a first ring gear that is formed with at least one first inside blade and at least one first outside blade coupled to a first gear cutter. The second gear set includes a second ring gear that is formed with at least one second inside blade and at least one second outside blade coupled to a second gear cutter. The method also includes identifying parameters of the first inside blade and the second inside blade, commonizing at least a portion of the respective identified parameters and forming at least one of a common inside blade and a common outside blade for forming a first modified ring gear and a second modified ring gear.

16 Claims, 4 Drawing Sheets

FACE HOB HYPOID GEAR TOOTH CUTTING BY COMMON BLADES

TECHNICAL FIELD

The disclosure generally relates to gear cutting and forming.

BACKGROUND

Hypoid gears are generally formed with a cutting machine that rotates both a cutter tool and a stock piece of metal while the axes of rotation of the cutter tool and the stock are orientated at an angle. The cutter tool and/or the stock are advanced toward one another, generally along the axes of rotation as the blades of the cutter tool shave material from the stock to form gear teeth on the stock. Some machines will vary the orientation of the cutter tool and/or stock perpendicular to the axis of rotation during cutting to form a desired hypoid tooth shape. Both pinion and ring gear of a hypoid gear set are cut in this manner. Typical cutting machines are disclosed in U.S. Pat. Nos. 5,116,173 to Goldricil, and 5,662,514 to Masseth, the disclosures of which are hereby incorporated by reference in their entireties.

Typically, a single cutter tool contains blades that are dimensioned to form a single gear for a single gear ratio (i.e. number of gear teeth/number of pinion teeth). That is, a cutter tool assembled with blades designed for cutting a ring gear with a gear ratio of 4.11 to 1 can not be used to cut a ring gear of a different gear ratio, and cannot be used to cut a pinion gear. In the example of a gear ratio of 4.11 to 1, a typical pinion for a vehicle differential has 9 teeth and the ring gear has 37 teeth. Many cutter tools may be dimensioned such that different blades may be used to form different gears of different gear ratios, but typically, the blades for forming the different gears are not common. That is, typically, a gear cutting tool includes a plurality of inside blades and a plurality of outside blades extending therefrom for forming the teeth of a hypoid gear. Typically, the inside blade forms the drive side of a hypoid ring gear tooth, and the outside blade forms the coast side of a hypoid ring gear tooth.

With continual development in blades, the life of a blade is extended due to, for example, tip coatings and blade materials and treatments. These developments permit blades to last longer and permit cutter tools to be used for longer periods of time between blade replacement.

SUMMARY

An illustrative embodiment includes a method includes selecting a first gear ratio and a second gear ratio. A first hypoid gear set defines the first gear ratio and a second hypoid gear set defines the second gear ratio. The first hypoid gear set includes a first ring gear that is formed with at least one first inside blade and at least one first outside blade coupled to a first gear cutter. The second gear set includes a second ring gear that is formed with at least one second inside blade and at least one second outside blade coupled to a second gear cutter. The method also includes identifying parameters of the first inside blade and the second inside blade, commonizing at least a portion of the respective identified parameters and forming at least one of a common inside blade and a common outside blade for forming a first modified ring gear and a second modified ring gear.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
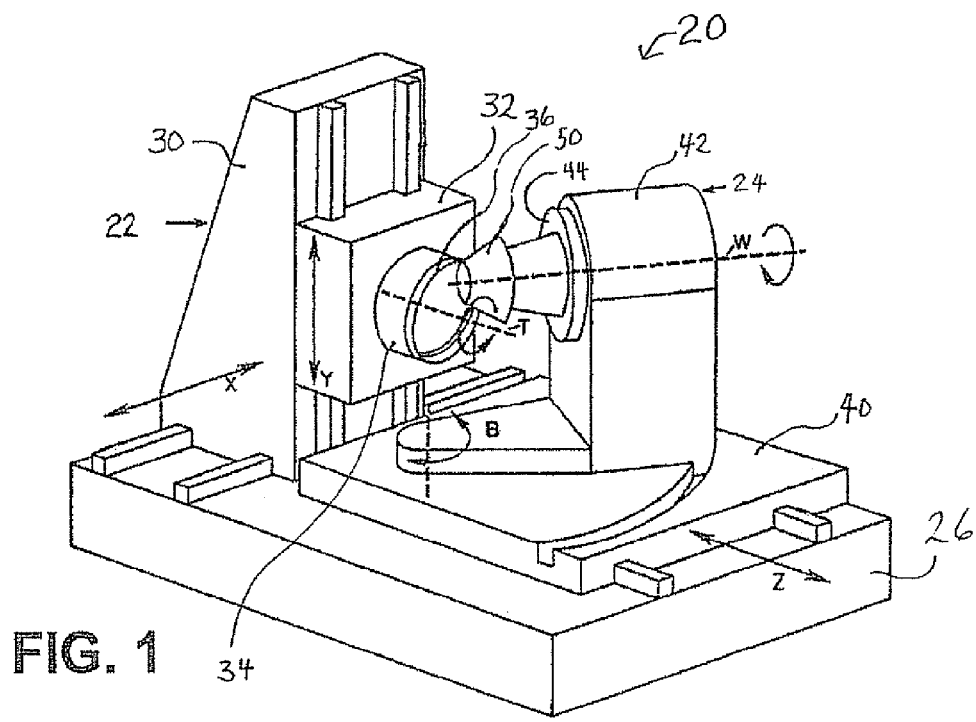
FIG. 1 is a schematic perspective view of a gear cutter system.

FIG. 1 illustrates an embodiment of a gear cutting system 20. The system 20 includes a tool support 22, and a work support 24 supported by a base 26. The tool support 22 includes a carriage 30, a tool head 32, and a tool spindle 34, and a cutting tool, illustrated generally at 36. The carriage 30 is moveable relative to the base 26 generally in the spatial direction X. The tool head 32 is moveable relative to the carriage 30 generally in the spatial direction Y. The tool spindle 34 may be moveable relative to the tool head 32 generally in the spatial direction Z while rotating the tool head 36. Accordingly, the tool head 36 may be rotated in the rotational direction T and moved in any of the spatial directions X, Y, Z simultaneously. Further, these movements are controlled by a device such as a computer numeric control (CNC) machine that may be capable of very fine adjustments on the order of millionths of an inch.

The work support 24 includes a table 40, a work head 42, and a work spindle 44. The work spindle 44 is illustrated with a gear stock 50 attached thereto. The work table 40 is moveable relative to the base 26 generally in the spatial direction Z. The work head 42 is moveable relative to the table 40 generally in the rotational direction B. The work spindle 44 is moveable relative to the work head 42 generally in the rotational direction W.

Accordingly, the system 20 may form at least hypoid teeth on the gear stock 50 as the cutting tool 36 is rotated relative to the gear stock 50. Generally, the axes of the gear stock and the cutter tool do not intersect, as illustrated in FIG. 1.

Figure 2:
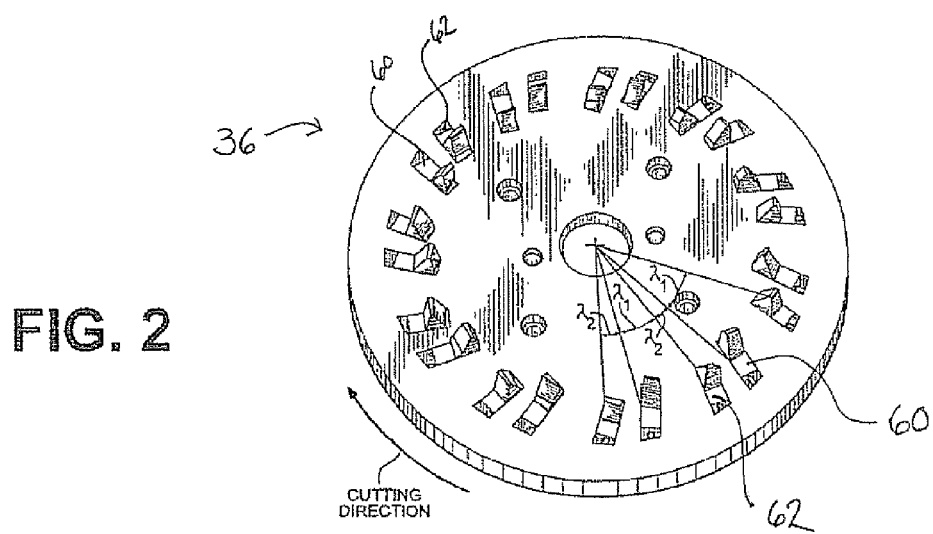
FIG. 2 is a perspective view of an exemplary gear cutter tool.

FIG. 2 illustrates the cutting tool 36 to include a plurality of inside blades 60 and a plurality of outside blades 62. While the tool 36 is illustrated with 11 pairs of blades 60, 62, other suitable numbers of blade pairs, such as 17 pairs, may be used. Further, either the inside blade 60 or the outside blade 62 may be adjusted as necessary to form the desired gear tooth profile.

Figures 3, 4:
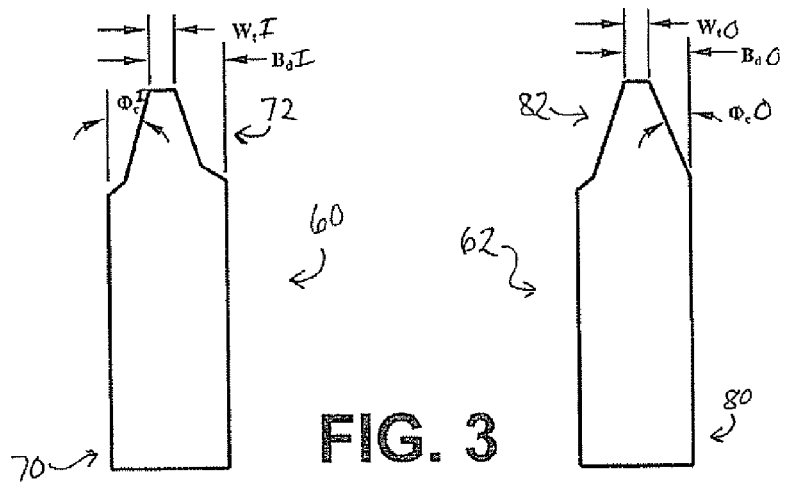
FIG. 3 is a side view of an exemplary inside blade.
FIG. 4 is a side view of an exemplary outside blade.

FIG. 3 generally illustrates an inside blade 60 to show the details for the discussion herein. The inside blade 60 includes a root end 70 and a tip end 72. The inside blade 60 also includes an inside cutting blade pressure angle $\phi cI$, an inside blade distance BdI, and an inside blade point width WtI.

FIG. 4 generally illustrates an outside blade 62 to show the details for the discussion herein. The outside blade 62 includes a root end 80 and a tip end 82. The outside blade 62 also includes an outside cutting blade pressure angle φcO, an outside blade distance BdO, and an outside blade point width WtO.

Figure 5:
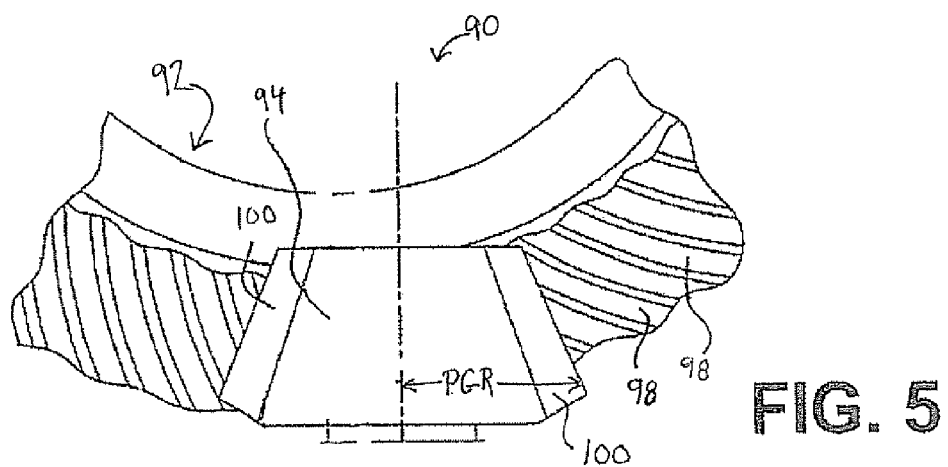
FIG. 5 is a partial sectional schematic view of a hypoid gear set.

FIG. 5 illustrates a partial view of a hypoid gear set 90. Hypoid gear set 90 includes a ring gear 92 and a pinion 94. The ring gear 92 includes a plurality of ring gear teeth 98. The pinion includes a plurality of pinion gear teeth 100 and is defined generally by a pinion outside gear radius PGR.

Figure 6:
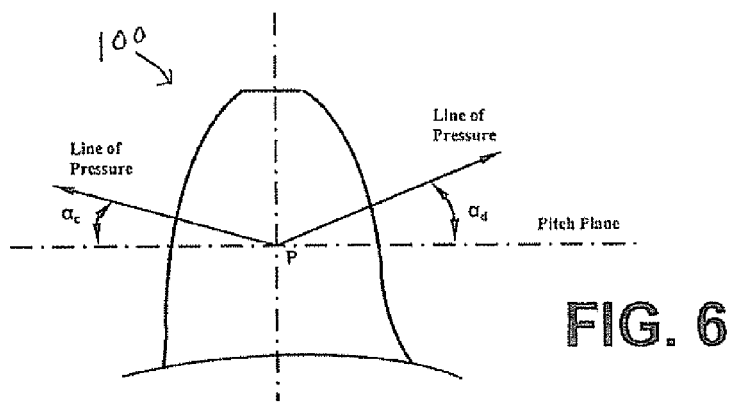
FIG. 6 is an enlarged partial sectional view of a gear tooth.

FIG. 6 illustrates an exemplary tooth profile of a pinion gear tooth 100 for a hypoid tooth of the pinion 94. The pinion tooth has a coast side pressure angle, or first pressure angle, $\alpha_c$ and a drive side pressure angle, or second pressure angle $\alpha_d$ that are measured relative to the pitch plane of the pinion 94.

Figure 7:
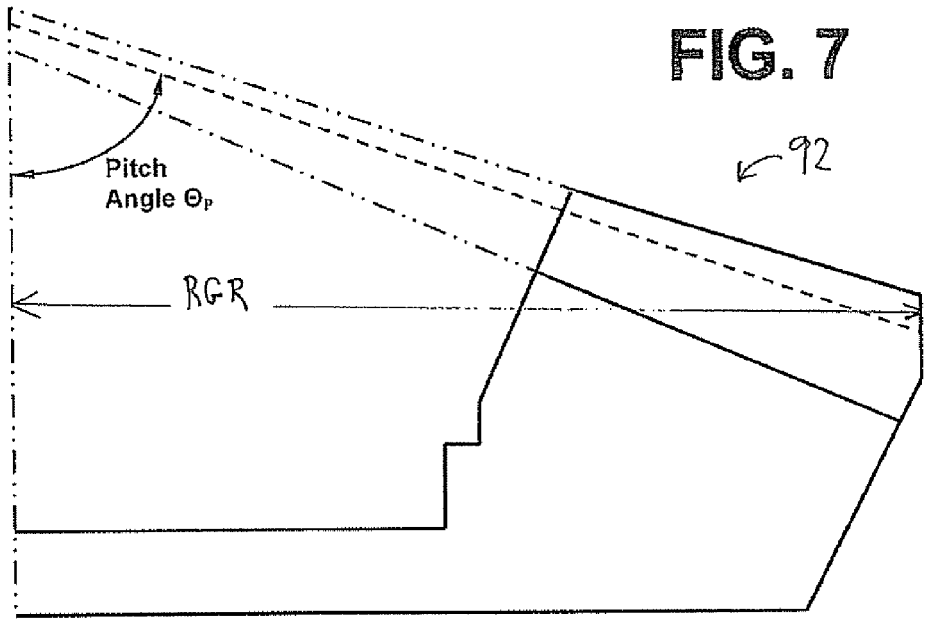
FIG. 7 is a partial sectional view of a ring gear.
Figure 8:
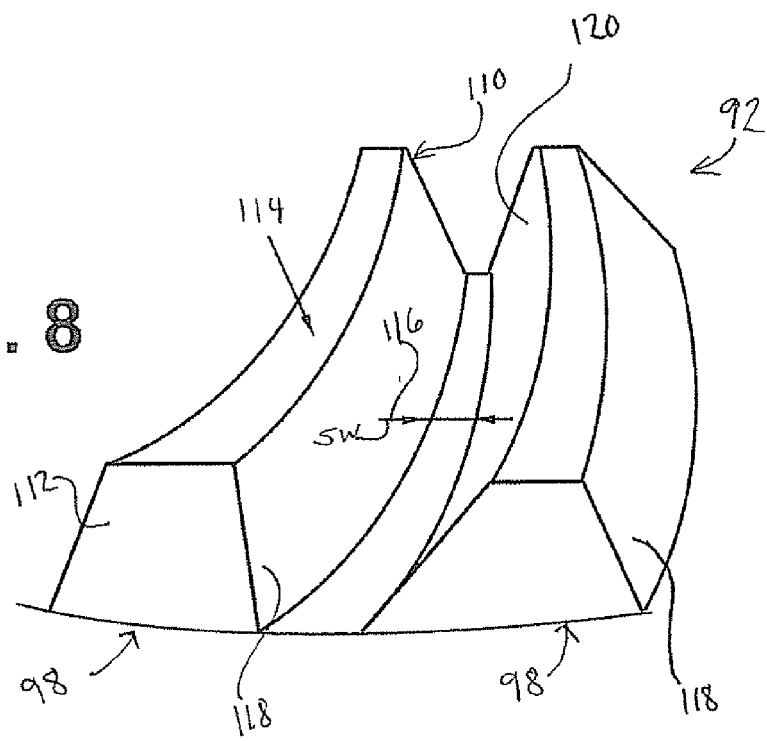
FIG. 8 is a partial perspective view of a gear.
Figure 9:
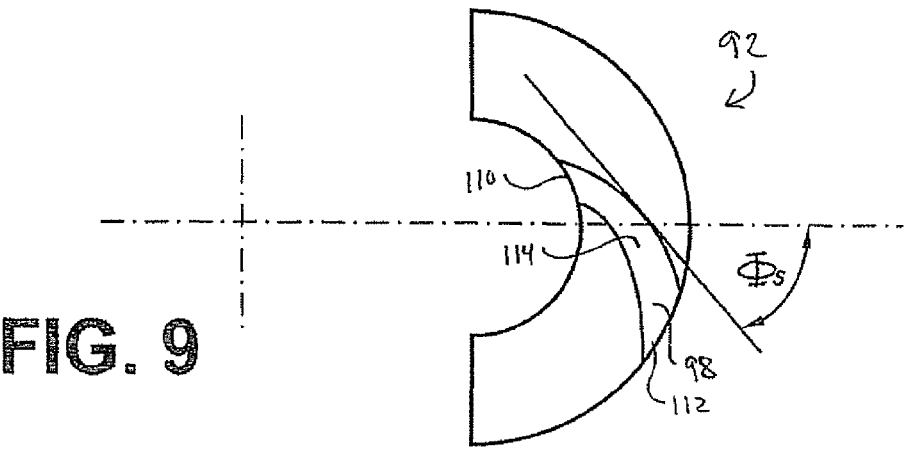
FIG. 9 is a partial end view of a gear during forming.

FIGS. 7-9 illustrate portions of the ring gear 92. FIG. 7 illustrates the pitch angle Θp and the ring gear radius RGR. FIG. 8 illustrates a toe 110, a heel 112, a top land 114, a mean slot width Sw 116 a drive side 118 of each tooth 98, and a coast side 120 of each tooth 98. FIG. 9 illustrates the spiral angle φs for an exemplary tooth 98.

Figure 10:
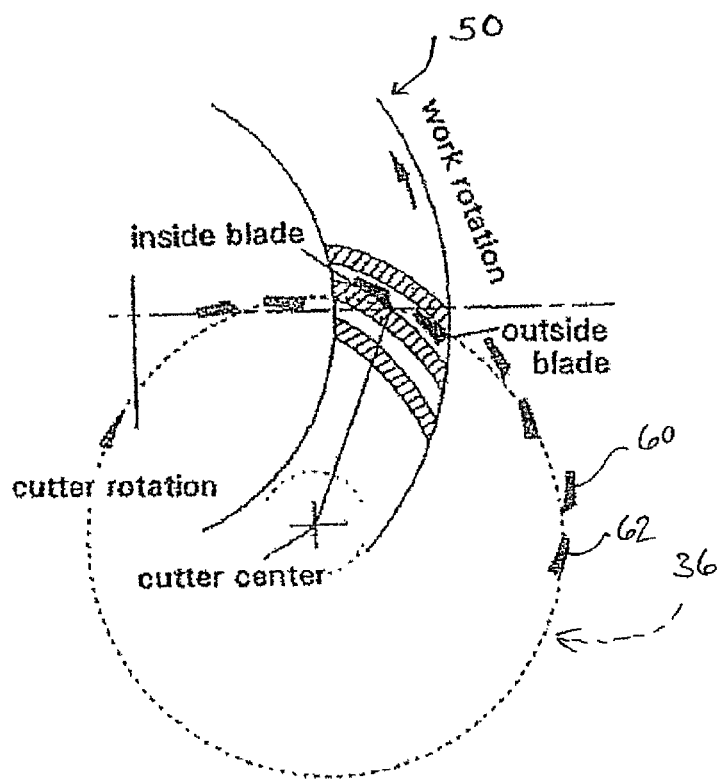
FIG. 10 is a schematic view of the orientation of a cutting tool to a gear stock.

FIG. 10 illustrates an exemplary relative orientation of the tool 36 to the gear stock 50 during forming of an exemplary ring gear.

To form a first hypoid ring gear, the tool 36 is rotated relative to a gear stock as the blades 60, 62 cut into the gear stock. In the exemplary embodiment illustrated, the gear stock is also rotated and the system 20 will vary the spatial orientation of the tool 36 relative to the gear stock. The relative movement of the tool 36 to the gear stock during each cutting stroke (FIG. 10) includes movements in the X and Y directions (FIG. 1). Accordingly, the Cuts made in the gear stock are not defined solely by the rotation of the tool 36 and the rotation of the gear stock 50, but also by the movements in the X and Y directions to form a desired tooth profile, such as the tooth profile illustrated schematically in FIG. 8. The speed of rotation of the tool 36 and the stock 50 may be several hundred or several thousand rotations per minute (rpm).

To form a second hypoid ring gear, the tool 36 is used while the movements in the X and Y directions of the system 20 are changed to form the desired tooth profile of the second hypoid gear. For example, the first hypoid ring gear may have 39 teeth while the second hypoid ring gear may have 41 teeth. In this example, the first hypoid gear may mesh with an eleven-tooth pinion gear to define a gear ratio of 3.55 (39/11), and the second gear may mesh with an eleven-tooth pinion gear to define a gear ratio of 3.73 (41/11). While each meshing gear set includes an eleven-tooth pinion, the pinions must have a different tooth profile to mesh correctly with its corresponding ring gear. As an additional example, a third gear ratio may include 43 ring gear teeth and 13 pinion teeth to define a gear ratio of 3.31 (43/13). In all of the above examples, the ring gear has an outer diameter of about 9.75 inches (24.77 centimeters).

To communize the blades 60, 62 for cutting each of the first ring gear (39 teeth), the second ring gear (41 teeth), and third ring gear (43 teeth), a new profile may be selected for the blades 60, 62, or an existing profile may be selected. That is, the profiles illustrated in FIGS. 3 and 4 for existing blades that cut one of the exemplary ratios may be selected and the other ratios formed with the same blades. As an example, the blades 60, 62 for forming the second ring gear (41 teeth) will be selected.

Once the blades 60, 62 are selected, the other ring gears are "designed around" the blades 60, 62. That is, corrections are made to the system 20, including the adjustable parameters discussed above, to form a ring gear that may have a different number of teeth than the selected blades were intended to form. One parameter is the relative speed of the tool 36 to the speed of the stock.

By way of further explanation, reference will be made to the drawings and the following paragraphs to illustrate various steps in at least one non limiting example of a method to face hob hypoid gear teeth with common blades.

Match the Sums of Gear Blade Pressure Angles

As seen in FIGS. 3 and 4, the inside blade pressure angle $\Phi_c I$, is added to the outside blade pressure angle $\Phi_c O$ for the selected ratio. Next, the inside blade pressure angle $\Phi_c I$, is added to the outside blade pressure angle $\Phi_c O$ for the target ratio. Then, the sum of the pinion tooth pressure angles of the pinion of the target ratio are increased or decreased until the corresponding sum of the inside blade pressure angle $\Phi_c I$ and the outside blade pressure angle $\Phi_c O$ for the target ratio is equal to the sum of the inside blade pressure angle $\Phi_c I$ and the outside blade pressure angle $\Phi_c O$ for the selected ratio.

Match the Gear Pressure Angles

Turning to FIG. 7, the gear pitch angle Θp for the target ratio may be increased or decreased as necessary until the inside blade pressure angle for the target ratio is identical to the inside blade pressure angle for the selected ratio and outside blade pressure angle for the target ratio is identical to the outside blade pressure angle for the selected ratio.

Match the Gear Blade Distances

Referring again to FIGS. 3 and 4, the inside blade distance $B_d I$ and the outside blade distance $B_d O$ are matched for the target ratio and the selected ratio. To accomplish this, the mean tooth slot width Sw and/or the spiral angle Φ (as seen in FIG. 9) of the target ratio are increased or decreased as necessary to provide a resulting inside blade distance and an outside blade distance that is about identical to the selected ratio.

Verify the Gear Blade Point Widths

Turning again to FIGS. 3 and 4, the inside blade point width $W_t I$ and the outside blade point width $W_t O$ of the selected ratio are considered to determined whether the resulting target ratio will have proper rootline cleanup without interference or clipping of the tooth profile. That is, if the blade point widths of the selected ratio are less than desired, the resulting ring gear formed for the selected ratio may have a ridge (not shown) within the tooth slot. Further, if the blade point widths of the selected ratio are more than desired, the resulting ring gear formed for the selected ratio may have portions of the tooth profile clipped as the inside blade cuts into the profile formed by the outside blade and/or the outside blade cuts into the profile formed by the inside blade. Adjustment of the blade point width of either the inside blade or the outside blade may be necessary.

Match the Pinion Blade Pressure Angles $\Phi_c I$ and $\Phi_c O$

Continuing with reference to FIGS. 3 and 4, the blades for the pinion are considered. Importantly, the blades for the ring gear are not the same blades for the pinion of the selected ratio. That is, the selected ratio requires a tool 36 for the ring gear having blades of a predetermined profile, and a separate tool having pinion blades of a predetermined profile. To form the desired target pinion of the target ratio using the selected tool of the selected ratio, adjustments are made to design input parameters (to system 20) such as the contact length factor, the tooth profile change, the bias change.

Match the Pinion Blade Distance

As seen in FIGS. 3 and 4, the pinion blade distances for the inside blade $B_d I$ and the outside blade $B_d O$ may be compensated for when forming the target pinion with the selected pinion blades by adjusting the cutter radius change.

Verify the Pinion Blade Point Widths

Continuing again with reference to FIGS. 3 and 4, the inside blade point width $W_tI$ and the outside blade point width $W_tO$ of the selected ratio are considered to determine whether the resulting pinion of the target ratio will have proper rootline cleanup without interference or clipping of the tooth profile. That is, if the blade point widths of the selected ratio are less than desired, the resulting pinion gear formed for the selected ratio may have a ridge (not shown) within the tooth slot. Further, if the blade point widths of the selected ratio are more than desired, the resulting pinion gear formed for the selected ratio may have portions of the tooth profile clipped as the inside blade cuts into the profile formed by the outside blade and/or the outside blade cuts into the profile formed by the inside blade. Adjustment of the blade point width of either the inside blade or the outside blade may be necessary.

If the blade point widths of the selected ratio is adequate to not introduce any undesired interference and will provide adequate rootline cleanup, then the selected ratio blades may be used to form the target ratio. However, some adjustment of the blades may be necessary.

After cutting either the selected ratio or target ratio (ring gear or pinion) the teeth are measured using a coordinate measuring machine (CMM) to determine whether the actual tooth profile is within acceptable tolerances of the desired tooth profile. Further adjustments to the system 20 may be necessary for any of the selected ratio ring rear or pinion or the target ratios ring gears or pinions.

In the embodiment illustrated the system 20 includes a microprocessor that will accurately control the movement of the tool in all parameters described above while the system is operating. Generally, this accuracy is within thousandths of an inch. Since the system 20 is intended to correct minor variations in the resulting gears, the flexibility to form multiple gear sets of multiple gear ratios with a pair of tools (one for the ring gear and one for the pinion) is afforded.

Many, if not all, dimensions of the first modified ring gear (target gear cut with common blades) are about identical to the dimensions of the first ring gear (target gear Cut with prior art dedicated blades), although some dimensions of the resulting gear may be slightly different from the original design without undesirable effects to strength and noise, vibrations, and harshness (NVH) characteristics.

The preceding description has been presented only to illustrate and describe exemplary embodiments of the methods and systems of the present invention. It is not intended to be exhaustive or to limit the invention to any precise form disclosed. It will be understood by those skilled in the art that various chances may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of forming multiple gears for multiple gear ratios comprising:
    selecting a first gear ratio and a second gear ratio, wherein a first hypoid gear set defines the first gear ratio and a second hypoid gear set defines the second gear ratio, wherein the first hypoid gear set includes a first ring gear that is formed with at least one first inside blade and at least one first outside blade coupled to a first gear cutter, and wherein the second gear set includes a second ring gear that is formed with at least one second inside blade and at least one second outside blade coupled to a second gear cutter;
    identifying parameters of the first inside blade and the second inside blade;
    communizing at least a portion of the respective identified parameters; and
    forming at least one of a common inside blade and a common outside blade for forming a first modified ring gear and a second modified ring gear;
    adjusting said inside and outside blades to cut multiple gears having multiple gear ratios.

2. The method of claim 1, wherein a diameter of the first ring gear is about equal to the diameter of the second ring gear.

3. The method of claim 1, wherein the identified parameters include at least one of an inside blade distance, an inside blade pressure angle, an inside blade point width, an outside blade distance, an outside blade pressure angle, and an outside blade point width.

4. The method of claim 1, wherein selected dimensions of the first modified ring gear are about identical to selected dimensions of the first ring gear, and wherein selected dimensions of the second modified ring gear are about identical to selected dimensions of the second ring gear.

5. The method of claim 4, wherein the selected dimensions include at least one of a slot width, a blade pressure angle and a spiral angle.

6. The method of claim 1, further comprising securing a plurality of common inside blades and a plurality of common outside blades to a common gear cutting tool.

7. The method of claim 6, further comprising forming the first modified ring gear and the second modified ring gear with the common gear cutting tool, wherein the first modified ring gear has a different number of teeth than the second modified ring gear.

8. The method of claim 7, further comprising comparing the dimensions of the first modified ring gear to predetermined dimensions of a desired tooth profile.

9. The method of claim 8, further comprising adjusting the inputs to a microprocessor of a gear cutting device to urge the device to form a first corrected ring gear that is defined by dimensions that are closer to the predetermined dimensions of the desired tooth profile than the dimensions of the first modified ring gear.

10. The method of claim 1, further comprising varying the spatial orientation of the at least one of a common inside blade and a common outside blade relative to the first modified ring gear as the at least one of a common inside blade and a common outside blade is rotated about an axis.

11. A method of forming multiple gears for multiple gear ratios comprising:
    identifying a first meshing gear set defined by a first gear ratio and a second meshing gear set defined by a second gear ratio;
    selecting a cutting tool having a plurality of inside blades and a plurality of outside blades that are used for forming a first meshing gear in the first gear set;
    directing a device to move the cutting tool relative to a first gear stock such that at least one gear of a gear set defined by the first gear ratio is formed; and directing the device to move the cutting tool relative to a second gear stock such that at least one gear of the gear set defined by the second gear ratio is formed.

12. The method of claim 11, wherein forming includes forming hypoid gear teeth.

13. The method of claim 11, further comprising directing the device to move the cutting tool relative to a third gear stock such that at least one gear of a gear set defined by a third gear ratio is formed.

14. The method of claim 11, further comprising increasing or decreasing the gear pitch angle of at least one of the meshing gears defined by the second gear ratio.

15. The method of claim 11, further comprising increasing or decreasing at least one of the gear mean tooth slot width and the spiral angle of at least one of the meshing gears defined by the second gear ratio.

16. The method of claim 11, further comprising:
selecting a second cutting tool having a plurality of inside blades and a plurality of outside blades that are used for forming a second meshing gear in the first gear set;
directing a device to move the second cutting tool relative to a fourth gear stock such that at least one gear of the gear set defined by the first gear ratio is formed; and
directing the device to move the second cutting tool relative to a fifth gear stock such that at least one gear of the gear set defined by the second gear ratio is formed.

* * * * *